March 6, 1945.　　　C. A. KOZA　　　2,370,906
ANGLE DRIVE FOR TOOLS OR THE LIKE
Filed March 23, 1944
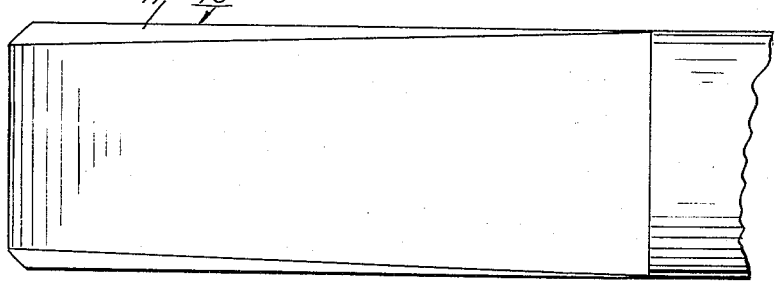
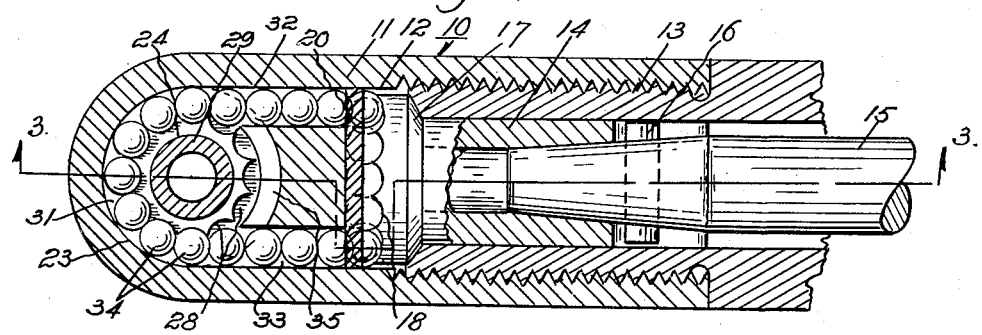
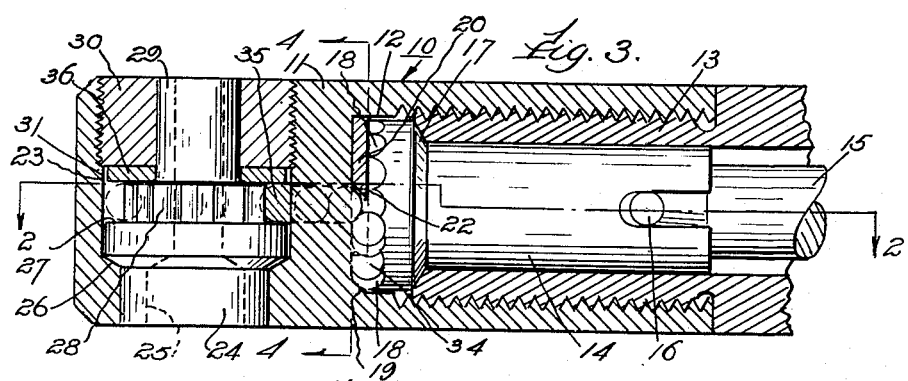
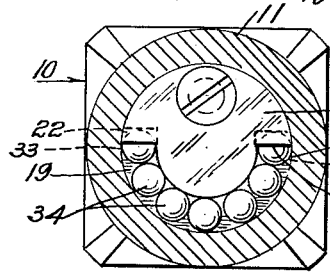
Inventor:
Charles A. Koza
by Stebbins, Blenko & Webb
Attorneys.

Patented Mar. 6, 1945

2,370,906

UNITED STATES PATENT OFFICE 2,370,906

ANGLE DRIVE FOR TOOLS OR THE LIKE

Charles A. Koza, Pittsburgh, Pa., assignor to Laura M. Koza, Rochester, N. Y.

Application March 23, 1944, Serial No. 527,711

9 Claims. (Cl. 74—189)

This invention relates to an angle drive and, in particular, to a drive for application to portable devices such as tools or the like.

Angle drives of various types have been proposed heretofore and used extensively, particularly on tools such as drills for operating in close quarters. I have invented an improved drive particularly suited for this application because of its simplicity, compactness and positive operation. In a preferred embodiment, the drive of my invention comprises a housing having a driving rotary head or member journaled therein and also a rotary driven head or member journaled on an axis at an angle to that of the driving member. Each of the members is provided with a series of recesses or pockets adapted to accommodate driving balls. The walls of the housing cooperate with the pocketed portions of the members to provide ball passages and conduits formed in the housing connect the ball passages of the two members. A belt of balls extending around the members and filling the conduits constitutes a driving connection whereby rotation of the driving member forces the balls around the driven member, thereby causing rotation thereof.

A complete understanding of the invention may be had from a consideration of the following detailed description which refers to the accompanying drawing illustrating a preferred embodiment. In the drawing, Figure 1 is a side elevation partly broken away;

Figure 2 is a longitudinal section view;

Figure 3 is a longitudinal sectional view taken along the plane of line III—III of Figure 2; line II—II of Figure 3 indicates the plane on which the section of Figure 2 is taken; and Figure 4 is a transverse section taken along the plane of line IV—IV of Figure 3.

Referring in detail to the drawing, my angle drive indicated generally at 10 comprises a housing 11 which may conveniently be in the form of a metal block, having a bore 12 extending into one end thereof. The bore 12 is tapped to receive the threaded end of a bearing sleeve 13. A driving member or head 14 is journaled in the sleeve 13 and is adapted to be driven by any convenient means such as a spindle 15 having a pin and slot connection 16 therewith. The spindle 15 may be connected to a suitable source of power, for example, by a flexible shaft.

A shoulder 17 formed on a head 14 adjacent its inner end engages the inner end of the sleeve 13 to hold the head in proper position in the bore. Ball pockets 18 are spaced circumferentially around the periphery of the inner end of the head 14. The wall of the bore 12, in cooperation with the pockets 18, forms a ball passage 19. A deflector plate 20 secured in the bottom of the bore 12 has a tongue 21 and beveled edges 22 which serve to guide balls around and from the passage 19.

The housing 11 is also provided with a bore 23 at an angle to the bore 12. In the embodiment illustrated, the bore 23 is at right angles to the bore 12. A driven head or member 24 is rotatably mounted in the bore 23 and has a bore 25 therethrough adapted to receive a tool or the like such as a drill. The bore 23 has a shoulder 26 intermediate its ends and the head 24 has a corresponding shoulder bearing against it. The head 24 also has a shoulder 27 with ball pockets 28 spaced therearound. A bearing stud 29 on the head 24 extends through a central hole in a bushing 30 threaded into the end of the bore 23.

The walls of the housing around the pocketed shoulder 27 of the head 24 define with the latter a ball passage 31. Conduits 32 and 33 extend tangentially from the passage 31 to the passage 19. A belt of balls 34 extends around the driving and driven heads filling the ball passages 19 and 31 and the conduits 32 and 33. A segmental guide block 35 is removably positioned in the bore 23 resting on the shoulder 27 of the head 24 and extending between the conduits 32 and 33. A bearing collar or race 36 is disposed between the bushing 30 and the balls in the passage 31.

It will be apparent that, with the construction described, rotation of the driving head 14 by means of the spindle 15 and the power source connected thereto will drive the balls 34 around the passage 19 into one of the conduits 32, 33, around the ball passage 31 and back to the passage 19 through the other conduit. The movement of the balls is effected by the engagement therewith of the pockets in the driving head and the corresponding engagement of the balls with the pockets 28 in the driven head causes the latter to be positively rotated. The guide block 35 keeps the balls in proper relation as they approach the passage 31 through one of the conduits 32, 33 and leave through the other. Similarly, the deflector plate 20, by means of its beveled edges 22 and tongue 21, guides the balls from one of the conduits into and around the passage 19 and out through the other conduit.

It will be apparent that the drive functions equally well in either direction without any change or adjustment except reversal of the driving head. Rotation of the driving head is transmitted positively to the driven head, the relative speeds being in the inverse ratio of the diameters of the ball passages, which, in the illustrated embodiment, are equal. The construction of the device is simple so that it can be made inexpensively and operated over long periods without requiring much attention.

An important advantage of the invention is that the balls traversing the passages 31 provide an antifriction thrust bearing for the driven head 24. It will be apparent that in using the drive for operating a drill, for example, the reaction of the work on the tool will come directly on the head. The balls in the passage 31 effectively carry this thrust over to the stationary race or collar 36 with little or no friction. The balls in the passage 19 perform the same function for the head 14, although the latter is not subject to substantial thrust as is the head 24. Any thrust in the other direction is taken by the shoulder 26, in the case of the head 24 and the end of the sleeve 13 in the case of the head 14.

Although I have illustrated and described but a preferred embodiment of my invention, it will be recognized that changes in the construction and arrangement disclosed may be made without departing from the spirit of the invention or the scope of the appended claims.

I claim:

1. An angle drive comprising a housing, a driving member journaled therein, a driven member journaled in the housing with its axis at an angle to that of the driving member, ball pockets on said driving and driven members, conduits in said housing adapted to guide balls moving between said members, and a belt of balls extending around said members disposed in the pockets thereof, and filling said conduits.

2. An angle drive comprising a housing, a rotary driving head journaled therein having ball pockets spaced around the inner end thereof, a rotary head journaled in said housing on an axis at an angle to that of said driving head and having ball pockets spaced circumferentially thereof, the walls of said housing defining ball passages around the pocketed portions of said heads, guide conduits extending tangentially from the ball pockets of one of said heads and at an angle to the plane containing the ball pockets of the other member, and a belt of balls extending around said members in the ball pockets thereof, and filling said conduits.

3. The apparatus defined by claim 2 characterized by a deflector plate overlying a segment of said other head, said plate having a tongue cooperating with the wall of the housing to define a circular ball passage around the end of said other head connecting said conduits.

4. The apparatus defined by claim 2 characterized by a segmental block extending around the pocketed portion of said one head between said conduits.

5. The apparatus defined by claim 2 characterized by guide means adjacent the intersection of the conduits and the ball passage around the first head.

6. An angle drive comprising a housing having a bore therein, a driving head journaled in said bore having ball pockets spaced around its inner end, a second bore in said housing at an angle to said first-mentioned bore, a driven head journaled in said second bore having a shoulder intermediate its ends with ball pockets spaced therearound, said bores defining ball passages around the pocketed portions of said driving and driven heads, conduits tangential to the passage around the driven head extending to the passage around the end of the driven head, and a belt of balls extending around said passages and through said conduits.

7. The apparatus defined by claim 6 characterized by a fixed race engaged by the balls in the pockets of the driven head whereby they provide an antifriction thrust bearing therefor.

8. The apparatus defined by claim 6 characterized by means for deflecting the balls from the passage around the driving head to one of the conduits and vice versa.

9. The apparatus defined by claim 6 characterized by guide means adjacent the intersection of the conduits and the ball passage around the driven head.

CHARLES A. KOZA.